US008606774B1

(12) United States Patent
Makadia et al.

(10) Patent No.: US 8,606,774 B1
(45) Date of Patent: *Dec. 10, 2013

(54) METHODS AND SYSTEMS FOR 3D SHAPE RETRIEVAL

(75) Inventors: Ameesh Makadia, New York, NY (US); Brian Brewington, Fort Collins, CO (US); Mark Limber, Boulder, CO (US); Corey Michael Joshua Goldfeder, New York, NY (US); Walter Thatcher Ulrich, New York, NY (US)

(73) Assignee: Google Inc., Mountain View, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 12/782,188

(22) Filed: May 18, 2010

Related U.S. Application Data

(60) Provisional application No. 61/179,287, filed on May 18, 2009.

(51) Int. Cl.
- G06F 17/30 (2006.01)
- G06F 3/048 (2013.01)
- G09G 5/02 (2006.01)

(52) U.S. Cl.
CPC ............... *G06F 17/30* (2013.01); *G06F 3/048* (2013.01); *G09G 5/02* (2013.01); *Y10S 715/968* (2013.01)
USPC ........... 707/723; 707/706; 707/748; 707/758; 707/769; 707/770; 715/757; 715/848; 715/850; 715/852; 715/968; 345/653; 345/664; 345/679

(58) Field of Classification Search
USPC .................. 707/748, 705–710, 758, 776–782, 707/796–807, 723, 769–770; 706/45–50; 345/419, 653, 664, 679; 715/757, 848, 715/850–852, 968
See application file for complete search history.

(56) References Cited

U.S. PATENT DOCUMENTS

| 6,009,190 A | * | 12/1999 | Szeliski et al. | 382/154 |
| 6,121,969 A | * | 9/2000 | Jain et al. | 715/850 |

(Continued)

FOREIGN PATENT DOCUMENTS

| EP | 2284770 | * | 2/2011 |
| WO | WO 01/93095 | * | 12/2001 |
| WO | WO 2010/020908 | * | 2/2010 |

OTHER PUBLICATIONS

Ding-Yun Chen et al. "On Visual Similarity Based 3D Model Retrieval", Eurographics 2003, vol. 22 (2003), No. 3, pp. 223-232.*

(Continued)

*Primary Examiner* — Srirama Channavajjala
(74) *Attorney, Agent, or Firm* — Sterne, Kessler, Goldstein & Fox P.L.L.C.

(57) ABSTRACT

Systems and methods for 3D shape retrieval are described herein. An embodiment includes obtaining a query 3D model, determining a similarity between the query 3D model and one or more 3D models based on a plurality of features of the query 3D model and corresponding features of the one or more 3D models, retrieving one or more similar 3D models based on the determining step and ranking the one or more similar 3D models based on the similarity. The embodiment further includes computing a feature distance between the query 3D model and the one or more 3D models for each feature, from a first set of features, associated with the query 3D model and the one or more 3D models and evaluating a first composite distance function using each feature distance. Another embodiment includes constructing a retrieval structure using each of the one or more 3D models for each feature associated with the one or more 3D models and searching the retrieval structure, for each feature, to determine 3D models similar to the query 3D model.

17 Claims, 11 Drawing Sheets

(56) References Cited

U.S. PATENT DOCUMENTS

| | | | |
|---|---|---|---|
| 6,609,123 B1* | 8/2003 | Cazemier et al. | 1/1 |
| 6,956,569 B1* | 10/2005 | Roy et al. | 345/426 |
| 7,228,316 B2* | 6/2007 | Gutierrez et al. | 707/769 |
| 7,545,973 B2* | 6/2009 | Hamanaka | 382/154 |
| 7,706,603 B2* | 4/2010 | Najafi et al. | 382/154 |
| 2003/0101176 A1* | 5/2003 | Kelkar | 707/6 |
| 2004/0150640 A1* | 8/2004 | Park et al. | 345/419 |
| 2004/0264777 A1* | 12/2004 | Furuhashi et al. | 382/190 |
| 2005/0131659 A1* | 6/2005 | Mei et al. | 703/1 |
| 2005/0168460 A1* | 8/2005 | Razdan et al. | 345/419 |
| 2005/0202861 A1* | 9/2005 | Dougherty et al. | 463/1 |
| 2006/0119618 A1* | 6/2006 | Knighton et al. | 345/619 |
| 2006/0143221 A1* | 6/2006 | Zhang et al. | 707/102 |
| 2009/0019402 A1* | 1/2009 | Ke et al. | 715/849 |
| 2009/0157649 A1* | 6/2009 | Papadakis et al. | 707/5 |
| 2009/0313239 A1* | 12/2009 | Wen et al. | 707/5 |
| 2010/0054607 A1* | 3/2010 | Aono et al. | 382/203 |
| 2012/0293505 A1* | 11/2012 | Meadow et al. | 345/419 |

OTHER PUBLICATIONS

Thomas Funkhouser et al, "A Search Engine for 3D Models", ACM Transactions on Graphics, vol. 22, No. 1, Jan. 2003. pp. 83-105.*

Eric Paquet et al., "Nefertiti: a Query by Content Software for Three-Dimensional models databases management", IEEE,1997, pp. 345-352.*

Yoshihiro Okada, "3D Model Database System by Hand Sketch Query", IEEE 2002, pp. 889-892.*

Weiwei Xing et al., "3D Object Classification System based on Volumetric Parts", IEEE 2007, pp. 984-990.*

* cited by examiner

METHODS AND SYSTEMS FOR 3D SHAPE RETRIEVAL

CROSS REFERENCE TO RELATED APPLICATIONS

This patent application claims the benefit of U.S. Provisional Patent Application No. 61/179,287, filed May 18, 2009, entitled "Methods and Systems For 3D Shape Retrieval," which is incorporated herein by reference in its entirety.

BACKGROUND

Background Art

Laser-scanned objects, computer-aided design models, and even image based reconstructions are a few of the sources contributing to the rapidly growing number of publicly available three-dimensional (3D) model collections. Along with these 3D model collections, which are often vast, comes the need for fast, large-scale model matching and retrieval.

3D model retrieval continues to be an important practical as well as fundamental problem. From the practical perspective, many large repositories of 3D models fail to leverage a full set of features associated with the models for model search and retrieval. This often leads to search results of limited success and applicability. Furthermore, 3D model repositories are becoming increasingly dynamic due to user generated content.

BRIEF SUMMARY

Embodiments of the present invention relate to methods and systems for 3D shape retrieval. An embodiment includes obtaining a query 3D model, determining a similarity between the query 3D model and one or more 3D models based on a plurality of features of the query 3D model and corresponding features of the one or more 3D models. Similar 3D models can then be retrieved based on the determining step and ranked based on the similarity. The embodiment further includes computing a feature distance between the query 3D model and the one or more 3D models for each feature, from a first set of features, associated with the query 3D model and the one or more 3D models, and evaluating a first composite distance function using each feature distance. Another embodiment includes constructing a retrieval structure using each of the one or more 3D models for each feature associated with the one or more 3D models and searching the retrieval structure, for each feature, to determine 3D models similar to the query 3D model.

A system embodiment includes a similarity engine to determine a similarity between a query 3D model and one or more 3D models based on a plurality of features of the query 3D model and corresponding features of the one or more 3D models, and retrieve one or more similar 3D models based on the similarity. The similarity engine further comprises a distance calculator configured to compute a feature distance between the query 3D model and the one or more 3D models for each feature, from a first set of features, associated with the query 3D model and the one or more 3D models, and to evaluate a first composite distance function using each feature distance.

In this way, embodiments of the invention use a plurality of features associated with each 3D model for 3D shape retrieval.

Further embodiments, features, and advantages of the embodiments, as well as the structure and operation of the various embodiments are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Embodiments of the present invention relate to methods and systems for 3D shape retrieval. An embodiment includes obtaining a query 3D model, determining a similarity between the query 3D model and one or more 3D models based on a plurality of features of the query 3D model and corresponding features of the one or more 3D models, retrieving one or more similar 3D models based on the determining step and ranking the one or more similar 3D models based on the similarity. The embodiment further includes computing a feature distance between the query 3D model and the one or more 3D models for each feature, from a first set of features associated with the query 3D model and the one or more 3D models, and evaluating a first composite distance function using each feature distance. Another embodiment includes constructing a retrieval structure using each of the one or more 3D models for each feature associated with the one or more 3D models and searching the retrieval structure, for each feature, to determine 3D models similar to the query 3D model.

In this way, embodiments of the invention use a plurality of features associated with each 3D model for 3D shape retrieval.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

This detailed description of the embodiments of the present invention is divided into several sections as shown by the following table of contents.

TABLE OF CONTENTS

Figure 1A:
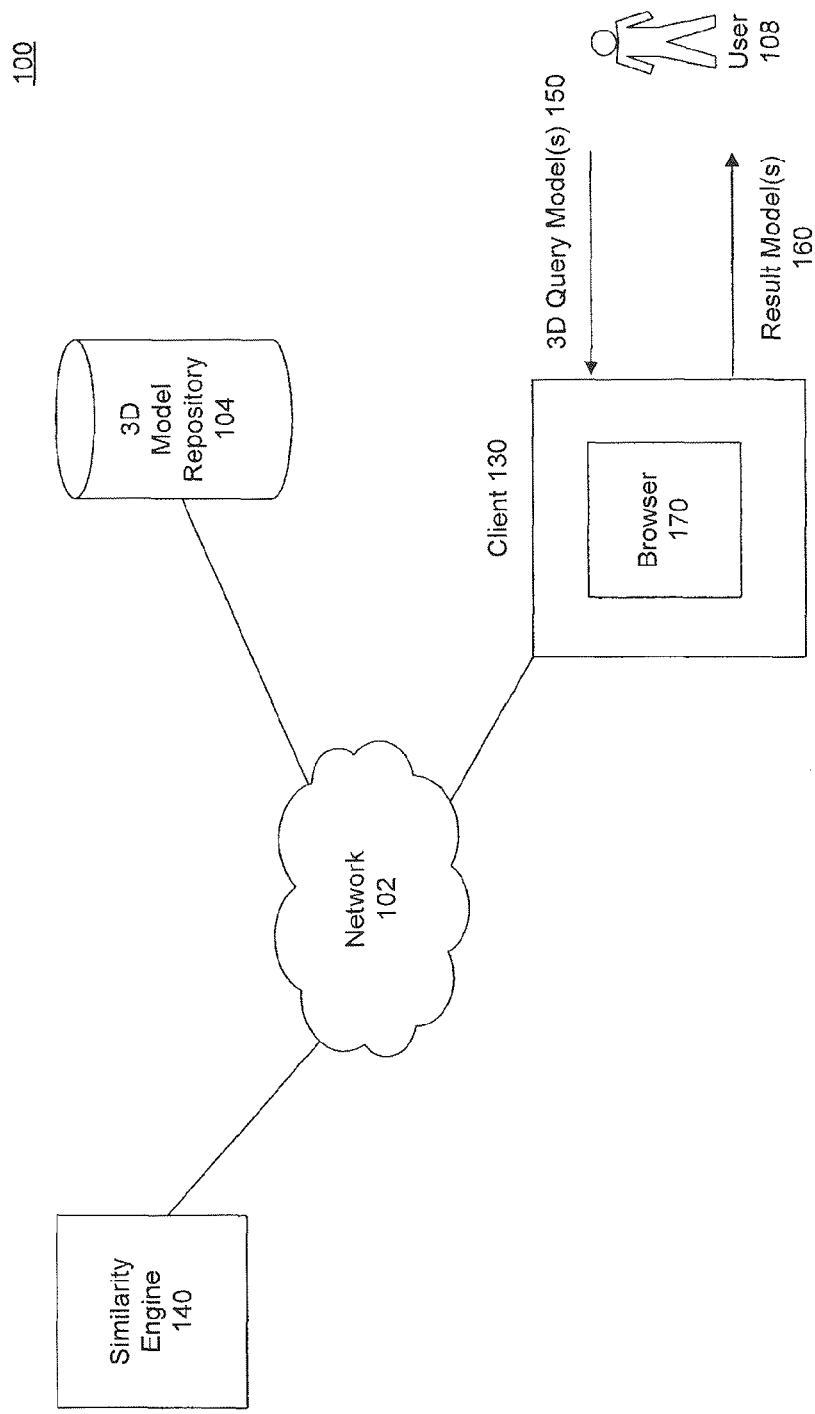
FIG. 1A is a diagram illustrating a system for 3D shape retrieval, according to an embodiment.

1. System
2. Similarity Engine 140
   2.1. Feature Extractor 220
   2.2. Distance Calculator 230
   2.3. Comparator 270 and Ranking Engine 210
      2.3.1. Brute-Force Method
      2.3.2. Retrieval Structure Method
3. Exemplary User Interface
4. Example Computer Embodiment 1. System This section describes a system for 3D shape retrieval according to an embodiment of the invention illustrated in FIG. 1A. FIG. 1A is a diagram of system 100 for 3D shape retrieval. (While the following is described in terms of FIG. 1A, the invention is not limited to this embodiment. For example, any system having generally the structure of FIG. 1A, or that would benefit from the operation, methods and functions as described herein may be used.)

System 100 includes 3D model repository 104, similarity engine 140 and client 130. Client 130 further includes browser 170. User 108 may communicate with browser 170 through client 130.

Client 130 may be implemented on a computing device. Such a computing device can include, but is not limited to, a personal computer, mobile device such as a mobile phone, workstation, embedded system, game console, television, set-top box, or any other computing device that can support web browsing. Such a computing device may include, but is not limited to, a device having a processor and memory for executing and storing instructions. Such a computing device may include software, firmware, hardware or a combination thereof. Software may include one or more applications and an operating system. Hardware can include, but is not limited to, a processor, memory and graphical user interface display. An optional input device, such as a mouse or touch screen, may be used. Similarity engine 140 may provide content that can be retrieved by client 130 over network 102. Content retrieved by client 130 can be displayed to user 108 by browser 170.

Network 102 may include one or more networks, including but not limited to, a local area network, medium-area network, and/or wide-area network, such as, the Internet. Network 102, for example, may be a wired or wireless network that allows client 130, similarity engine 140, and 3D model repository 104 to communicate with each other. Network 102 can further support world-wide web protocols and services.

Browser 170 can communicate with similarity engine 140 over network 102. Browser 170 can further communicate with an input (not shown) to allow a user to input data, to input commands, or to provide other control information to browser 170. User 108 may communicate with browser 170 using client 130. As an example, user 108 may provide an internet address to browser 170 to retrieve and display content corresponding to the internet address. Browser 170 may then provide a request for content to similarity engine 140. Similarity engine 140 may respond to the request by providing content back to browser 170 through client 130 over network 102. In an embodiment, browser 170 receives one or more 3D models as a query from user 108. In another embodiment, browser 170 may also receive one or more 3D models as a query from another computing device, program or automated system (not shown).

3D model repository 104 may include a plurality of 3D models. As an example, not intended to limit the invention, each 3D model may be stored in an Object File Format (e.g. ".off" format) with polygonal geometry associated with the 3D model. Additionally, for example, 3D model repository 104 may also include a model information file and a thumbnail image of each 3D model. Along with every 3D model, repository 104 stores metadata associated with each 3D model. Such metadata may include, but is not limited to, descriptive textual tags, thumbnail images of a 3D model, multiple features describing a 3D model's shape, and a list of 3D models that are similar in shape to a given 3D model.

3D model repository 104 may include models in the open COLLADA file format. COLLADA defines an open standard XML schema for exchanging digital assets among various graphics software applications that might otherwise store their assets in incompatible file formats. In one example, COLLADA documents that describe digital assets are XML files, usually identified with a .dae (digital asset exchange) filename extension.

In another example, 3D model repository 104 may store a plurality of user generated 3D models. Such user generated 3D models may be provided by user 108 to 3D model repository 104 through client 130 via network 102. Thus, content in 3D model repository 104 is dynamic and any modification to 3D models in repository 104 causes metadata associated with those models to be updated by 3D model repository 104 and feature extractor 220. As a purely illustrative example, if a 3D model's shape is changed, new features and a new thumbnail image will be computed by feature extractor 220. The operation of feature extractor 220 is described further below. 3D model repository 104 may be a web-based repository that communicates over network 102 using web-based protocols. As an example, 3D model repository 104 may be implemented on a computing device that includes a database or any another data repository.

2. Similarity Engine 140

In one embodiment, similarity engine 140 may receive one or more query 3D model(s) 150 from client 130 though network 102. In another embodiment, similarity engine 140 may also use any 3D model from the plurality of 3D models in 3D model repository 104 as query 3D model 150. Upon receiving a query 3D model 150 (or retrieving a query 3D model from the 3D models in 3D model repository 104), shape retrieval engine may return one or more matching 3D model(s) 160 to client 130 for display to user 108 using browser 170. As an example, query 3D model 150 includes information to support a query for a 3D model.

In this way, similarity engine 140 can determine 'nearest neighbors' or the most similar models to each 3D model in 3D model repository 104. Furthermore, according to an embodiment, 3D models in 3D model repository 104 can be pre-processed, even before query 3D model 150 is received, to determine the most similar models to each 3D model in 3D model repository 104. Therefore, when query 3D model 150 is received from user 108, any pre-computed nearest neighbors can be displayed in less time to user 108.

As an example, similarity engine 140 may be implemented on a computing device. Such a computing device may include, but is not limited to, a device having a processor and memory for executing and storing instructions. Such a computing device may include software, firmware, hardware or any combination thereof. Software may include one or more applications and an operating system. Hardware can include, but is not limited to, a processor, memory and graphical user interface display. An optional input device, such as a mouse or touch screen, may be used.

Figure 1B:
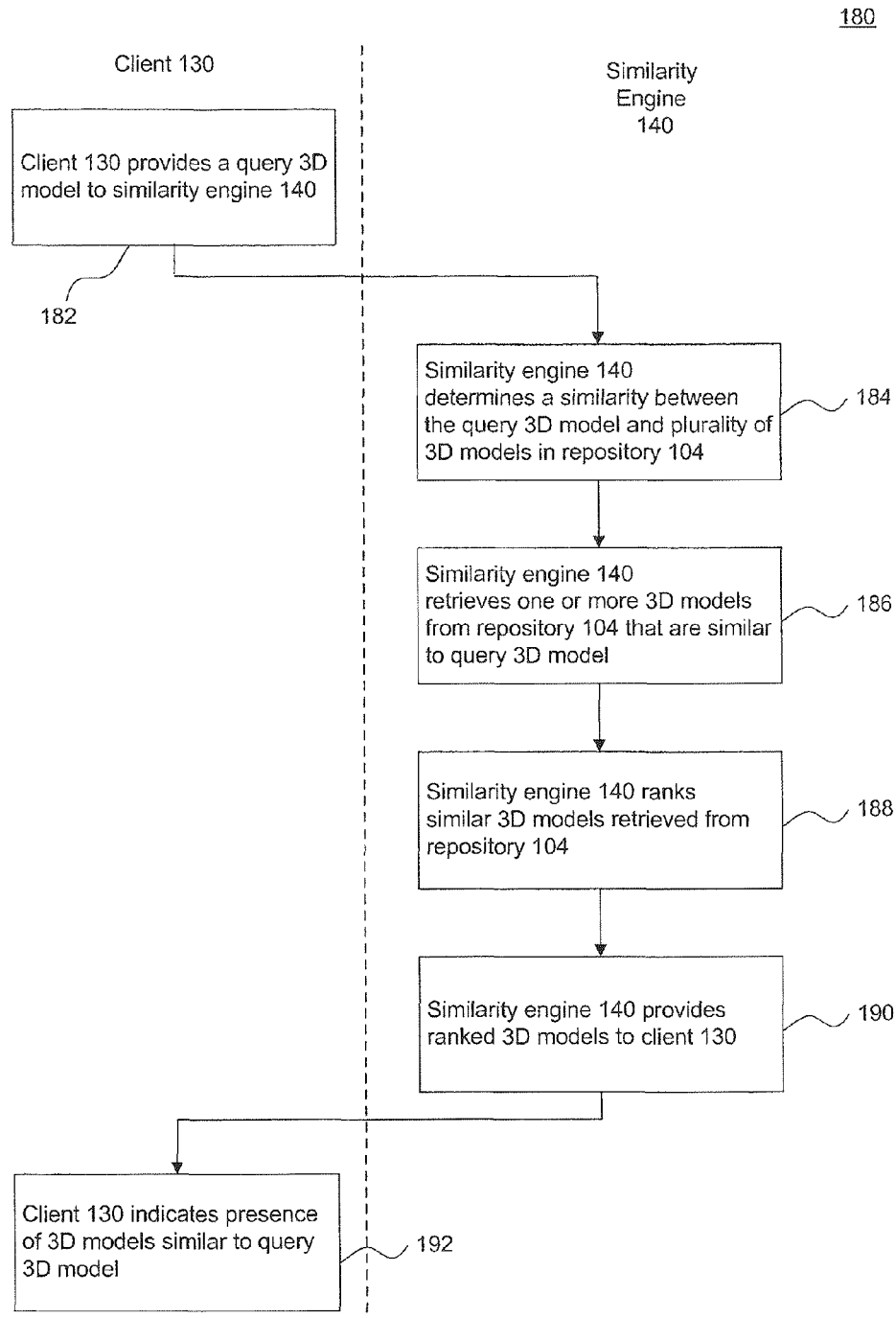
FIG. 1B illustrates an exemplary operation of the system described in FIG. 1A, according to an embodiment.

FIG. 1B illustrates method 180. Method 180 is an exemplary operation of an interaction between client 130 and similarity engine 140, according to an embodiment of the invention.

In step 182, client 130 provides a query 3D model 150 to similarity engine 140. Alternatively, similarity engine 140 may also use any 3D model from the plurality of 3D models in 3D model repository 104 as query 3D model 150. As an example, the 3D model provided by client 130 is received from user 108 via browser 170. An exemplary user interface to provide a query 3D model is described further below.

In step 184, similarity engine 140 determines a similarity between the query 3D model 150 and a plurality of 3D models in 3D model repository 104. Also, for example, 3D models in 3D model repository 104 can be pre-processed by similarity engine 140, even before query 3D model 150 is received, to determine most similar models to each 3D model in 3D model repository 104.

In step 186, similarity engine 140 retrieves one or more 3D models that are similar to query 3D model 150 from 3D model repository 104.

In step 188, similarity engine 140 ranks the similar 3D models retrieved from 3D model repository 104. Ranking and re-ranking of retrieved 3D models by ranking engine 210 is described further below.

In step 190 similarity engine 140 provides the similar 3D models that have been ranked in step 188 to client 130.

In step 192, client 130 indicates presence of one or more similar 3D models to user 108 using browser 170. As an example, client 130 may display a user interface element (e.g. a link) to user 108 using browser 170. User 108, may, for example, click the user interface element to display the similar 3D models. An exemplary user interface is described further below.

Figure 2A:
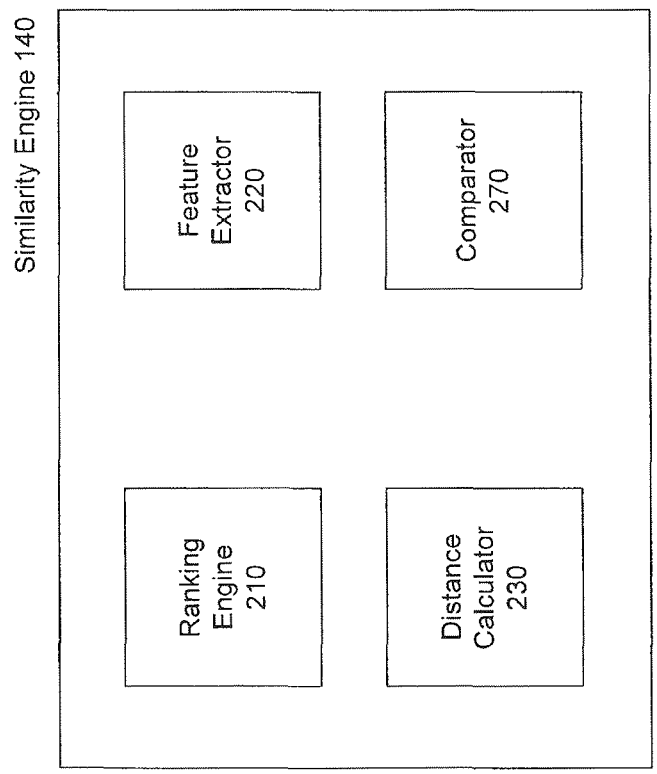
FIG. 2A illustrates a similarity engine, according to an embodiment.

FIG. 2A illustrates a diagram of similarity engine 140, according to an embodiment of the invention. As shown in FIG. 2A similarity engine 140 includes ranking engine 210, feature extractor 220, distance calculator 230 and comparator 270.

2.1 Feature Extractor 220

In an embodiment, feature extractor 220 extracts a collection of features from each 3D model in 3D model repository 104. In another embodiment, feature extractor 220 extracts one feature from each 3D model in 3D model repository 104. Features extracted from 3D models by feature extractor 220 may describe a 3D model along various parameters such as shape or location.

Some examples of shape-based features include shape distributions, extended Gaussian images, shape histograms and shape scales. An example of a location-based feature may be the latitude and longitude of a 3D model's location on the Earth (e.g. a model of the Eiffel Tower would be located in Paris). Another exemplary set of features is associated with the appearance of a 3D model (e.g. appearance of a textured 3D model). This is because in addition to comparing shapes, user 108 may wish to find 3D models that use similar photographic textures. Other types of information such as metadata that includes textual keyword tags and metadata such as historical user-click logs received from browser 170 may also be used by similarity engine 140 for determining similarity between 3D models.

It is to be appreciated that the operation of feature extractor 220 is not limited to the extraction of shape, location and appearance based features and any other features associated with 3D models can be extracted by feature extractor 220.

Some exemplary features that may be extracted by feature extractor 220, include but are not limited to:

(1) D2 Shape Distribution (i.e., for example, a histogram of distances between pairs of points on the shape's surface).

(2) Extended Gaussian Image (i.e., for example, a histogram of surface noinial orientations).

(3) Spin Images (i.e., for example, histograms of local shape distribution centered at interest points).

(4) 3D Zernike descriptor (i.e., for example, a voxel representation of 3D shape projected onto 3D basis).

(5) Geo-Location (i.e., for example, latitude/longitude of a 3D model's location).

(6) Scale (i.e., for example, a descriptor that captures the size/scale of a 3D model).

(7) Light Field Descriptor (i.e., for example, a collection of rendered silhouette images from viewpoints surrounding a 3D shape).

In an embodiment, as 3D model repository 104 is dynamic (e.g. due to user generated content), feature extractor 220 pre-processes and extracts features for a 3D model whenever there is a change to the 3D model in 3D model repository 104. As an example, when a new model gets added to the repository, its features are extracted for the first time by feature extractor 220. Whenever this newly added 3D model is changed by user 108, new features are once again extracted by feature extractor 220.

2.2 Distance Calculator 230

In an embodiment, distance calculator 230 computes feature distances between query 3D model 150 and one or more 3D models in repository 104.

For many of the exemplary features listed above, a common distance measure used by distance calculator 230 is L2 (Euclidean distance) or L1 (Manhattan distance). As an example, not intended to limit the invention, distance measures L2 or L1 can be used to compare the above listed features such as D2 shape distribution, extended Gaussian image, 3D Zernike descriptor, geo-location and scale. As an example, any of these features can be used for a nearest neighbor computation (i.e. to determine similar 3D models) according to embodiments of the invention.

Spin images and Light Field Descriptors are examples of features which, for example, may not be compared using "fast" distance measures. For example, in spin images, models are usually represented with a plurality of (e.g. tens, hundreds, or even thousands) spin images. In this case, model comparison by similarity engine 140 involves comparing entire collections of spin images between a pair of 3D models. Similarly, for Light Field Descriptors, models may be compared by comparing entire collections of silhouette images and their possible alignments. In an embodiment, not intended to limit the invention, spin images and Light Field Descriptors may be used as features for re-ranking by ranking engine 210. Furthermore, both ranking an re-ranking operations by ranking engine 210 may use any of the features described herein. Re-ranking by ranking engine 210 is described further below.

Returning to the operation of distance calculator 230, in an embodiment, distance calculator 230 also evaluates a composite distance function, which given two 3D models (e.g. a query 3D model and a 3D model in repository 104) and their respective feature sets, computes a distance (or similarity) score between the two 3D models. As an example, "similarity" and "distance" have an inverse relationship to each other.

Thus, when the distance between two 3D models increases, similarity between the 3D models decreases. As an illustrative example, 3D models which are identical are separated by zero distance and have a maximal similarity (which may be infinite or finite). As similarity and distance are inter-related, an operation which computes a "distance" can also compute a "similarity" using a simple mathematical transform. It is to be appreciated that any functional relationship between distance and similarity can be used by embodiments of the invention.

In an embodiment, distance calculator 230 evaluates a composite distance function as an average of all the individual feature distances between two 3D models. In another embodiment, the composite distance function is a function that aggregates the individual feature distances according to some pre-determined weighting (e.g. shape-based features may be given more weight than location features). This pre-determined weighting can be configured by user 108, or the weights can be learned using exemplary Machine Learning techniques such as logistic regression or LASSO (penalized logistic regression).

Thus, in an embodiment, distance calculator 230 uses a composite distance function that takes two 3D models and multiple features for each 3D model, and returns a value that corresponds to the distance (or similarity) between the two 3D models.

2.3 Comparator 270 and Ranking Engine 210

In an embodiment, given pre-computed features for each 3D model in 3D model repository 104, comparator 270 computes 'N' nearest neighbors (or 'N' similar models) for every 3D model in repository 104. Ranking by ranking engine 210 is a ordering of the N nearest neighbors for each query, which based on a distance score between the query 3D model to the N nearest neighbors. In an embodiment, the value of N can be varied by similarity engine 140. For example, a different value of N may be used for each model. Additionally, the nearest neighbors (i.e. similar 3D models) may be computed offline (pre-processed) or may even be computed in real-time (online). For example, query 3D model 150 could be a 3D model provided by user 108, which may be a 3D model similarity engine 140 has never encountered in the past. In such a scenario, similarity engine 140 may extract features and compute nearest neighbors of query 3D model 150 in real-time (online), instead of retrieving pre-computed nearest neighbors or a pre-computed nearest neighbors list from 3D model repository 104.

In an embodiment, 3D models similar to a query 3D model or other models in 3D model repository 104 can be computed by a 'brute-force' method. In another embodiment, 3D models similar to a query 3D model or other models in 3D model repository 104 can be computed by a method that uses approximate nearest neighbor retrieval structures. The brute force method and tree based retrieval structure method are described below.

2.3.1. Brute-Force Method

In this embodiment, for each 3D model in 3D model repository 104, distance calculator 230 computes a distance to every other 3D model in 3D model repository 104 using the composite distance function as described above. The 'N' most similar models are then returned as the nearest neighbors by comparator 270. In this embodiment, as distance calculator 230 performs all possible distance computations, the 'brute-force' method provides all N closest neighbors of all 3D models in 3D model repository 104 (according to the distance function). In an embodiment, if the composite distance function is symmetric (e.g. the distance from a model A to another model B is the same as the distance measured from model B to model A), then distance calculator 230 only needs to perform half the similarity computations.

Figure 3:
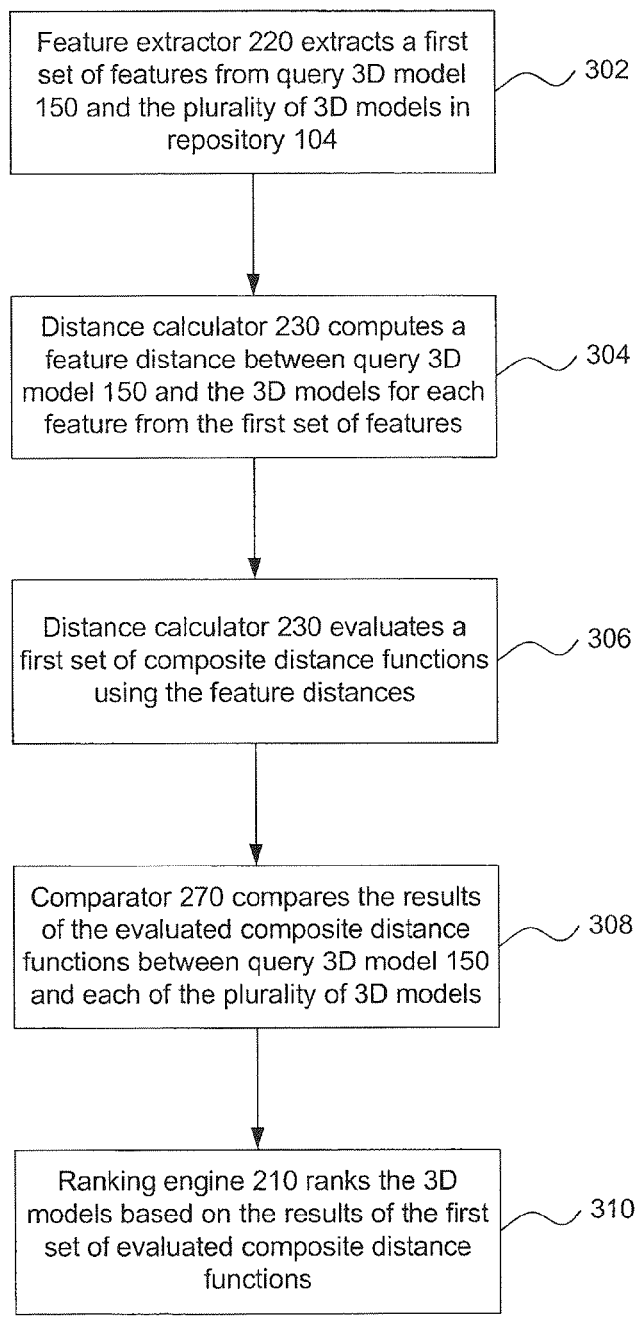
FIG. 3 is a flowchart illustrating ranking of a plurality of 3D models based on evaluation of a composite distance function, according to an embodiment.

FIG. 3 is a flowchart illustrating ranking of a plurality of 3D models based on a composite distance function, according to an embodiment.

In step 302, feature extractor 220 extracts a first set of features from query 3D model 150 and a plurality of 3D models from 3D model repository 104.

In step 304, distance calculator 230 computes a feature distance between two or more 3D models for each feature from the first set of features.

In step 306, distance calculator 230 evaluates a first composite distance function using the feature distances from step 304.

In step 308, comparator 270 compares the results of the evaluated composite distance function (i.e. similarity scores) between query 3D model 150 and each of the plurality of 3D models from 3D model repository 104 to determine 3D models similar to query 3D model 150.

In step 310, ranking engine 210 ranks 3D models similar to query 3D model 150 based on their similarity to query 3D model 150.

2.3.2. Retrieval Structure Method

Figure 2B:
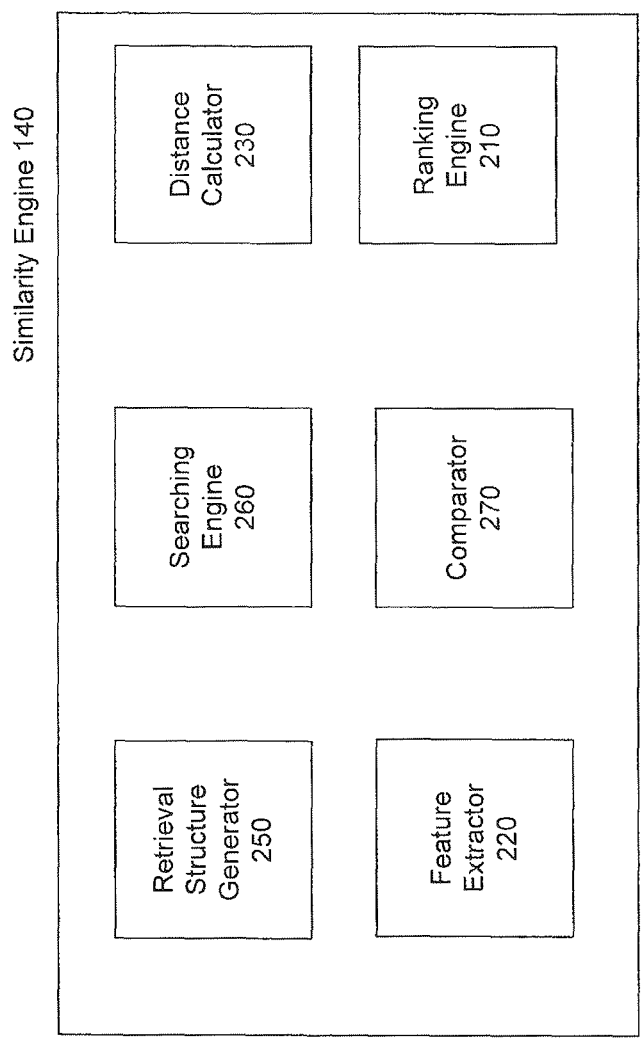
FIG. 2B illustrates a similarity engine, according to another embodiment.

FIG. 2B illustrates similarity engine 140, according to another embodiment of the invention. In this embodiment, similarity engine 140 includes retrieval structure generator 250 and searching engine 260. In an embodiment, retrieval structure generator 250 constructs a retrieval structure using each of the one or more 3D models for each feature associated with the one or more 3D models. Searching engine 260 may then search the retrieval structure, for each feature, to determine 3D models similar to the query 3D model. Similarity engine 140 further includes distance calculator 230, feature extractor 220, ranking engine 210 and comparator 270 which have been described above.

In this embodiment, for each separate feature type, retrieval structure generator 250 constructs an approximate nearest neighbor (ANN) retrieval structure using 3D models from 3D model repository 104. As an example, such a structure could be a tree structure such as a k-dimensional tree (kd tree) or a hashing structure that uses a nearest neighbor hashing function such as locality sensitive hashing (LSH). Kd trees are known to those skilled in the art. A kd-tree, for example, can be a space-partitioning data structure for organizing points in a k-dimensional space. Kd-trees are a useful data structure for several applications, such as searches involving a multidimensional search key (e.g. range searches and nearest neighbor searches). Locality sensitive hashing (LSH), for example, is a method of performing probabilistic dimension reduction of high-dimensional data. As an example, not intended to limit the invention, tree-based retrieval returns exact nearest neighbors or approximate nearest neighbors, and hashing-functions return only approximate neighbors.

For each feature, searching engine 260 finds the N nearest neighbors (or N similar 3D models) of query 3D model 150 by searching efficiently in the ANN structure constructed by retrieval structure generator 250.

Figure 4:
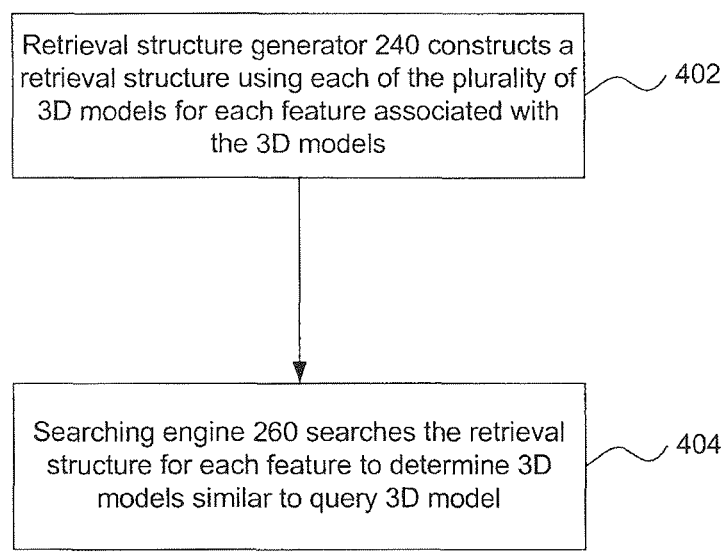
FIG. 4 is a flowchart illustrating an operation of a retrieval structure generator and searching engine, according to an embodiment.

FIG. 4 is a flowchart illustrating the operation of retrieval structure generator 250 and searching engine 260, according to an embodiment.

In step 402, retrieval structure generator 250 constructs a retrieval structure using each of the plurality of 3D models in 3D model repository 104.

In step 404, searching engine 260 searches the retrieval structure constructed in step 402, for each feature, to determine 3D models similar to a query 3D model.

Thus, for each feature, searching engine 260 generates N possible neighbors, and if, for example, there are K features in total, there can exist K*N possible neighbors (or similar 3D models). As K*N may be much smaller than the total number of models in 3D model repository 104, this smaller set of K*N possible neighbors can be used perform a 'brute-force' similarity computation, with the composite distance function, to find N nearest neighbors to be returned to user 108.

Once searching engine 260 has determined the N nearest neighbors for every query 3D model 150, ranking engine 210 may re-rank the N nearest neighbors based on their individual similarity to query 3D model 150. Re-ranking by ranking engine 210 is a re-ordering of the N nearest neighbors for each query 3D model, which is performed by re-computing a distance score using distance calculator 230 from query 3D model 150 to the N nearest neighbors. This re-computed distance score, for example, can take into account additional information such as more or different features.

If a different feature set is used for re-ranking by ranking engine 210, distance calculator 230 may use a different composite distance function that uses these different features. Additionally, ranking engine 210 may perform multiple re-ranking steps; where at each step different features (or other parameters) are used to re-rank a neighbors list returned from a previous iteration. In an embodiment, not intended to limit the invention, after each re-ranking stage, ranking engine 210 can return a smaller neighbors list or ranked neighbors. As a purely illustrative example, after a first ranking stage, there may exist N=400 neighbors, but after the first re-ranking step there could exist only N=100 neighbors. This can be an exemplary scenario where there are multiple re-ranking stages, and a different feature set is used in each stage.

Figure 5:
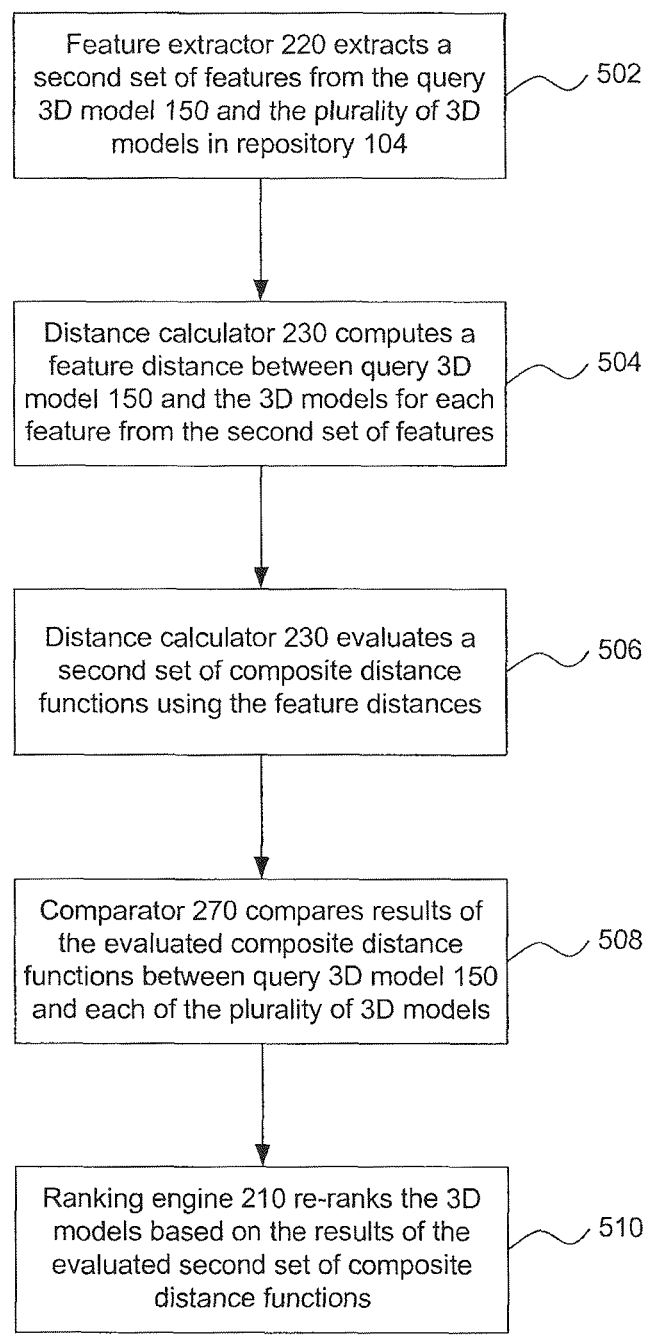
FIG. 5 is a flowchart illustrating the re-ranking of 3D models, according to an embodiment.

FIG. 5 is a flowchart illustrating re-ranking of a plurality of 3D models based on a composite distance function, that uses a different feature set, according to an embodiment.

In step 502, feature extractor 220 extracts a second set of features from query 3D model 150 and a plurality of 3D models from 3D model repository 104. (It is to be appreciated that similarity engine 140 may also use any 3D model from the plurality of 3D models in 3D model repository 104 as query 3D model 150.)

In step 504, distance calculator 230 computes a feature distance between two or more 3D models for each feature from a first set of features.

In step 506, distance calculator 230 evaluates a second composite distance function using the feature distances.

In step 508, comparator 270 compares the results of the evaluated composite distance function (i.e. similarity scores) between query 3D model 150 and each of the plurality of 3D models from 3D model repository 104.

In step 510, ranking engine 210 re-ranks 3D models similar to query 3D model 150 based on their similarity to query 3D model 150.

The re-ranked list of neighbors is stored in the repository 104 by similarity engine 140. Also, since the 3D model repository 104 is dynamic in content, the neighbors for a 3D model can be re-computed by similarity engine 140 whenever a 3D model in repository 104 is changed (e.g. any addition or deletion of a 3D model in 3D model repository 104).

3. Exemplary User Interface

As described earlier, browser 170 can communicate with shape retrieval engine 120 over network 102. User 108 may communicate with browser 170 using client 130. As an example, user 108 may provide a query 3D model to similarity engine 140 using browser 170. Similarity engine 140 may respond to the request by providing 3D models similar to the query 3D model to browser 170 over network 102.

Figure 6:
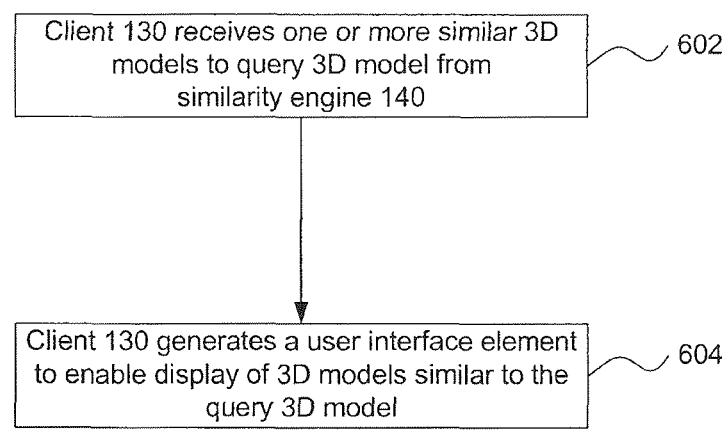
FIG. 6 is a flowchart illustrating the generation of a user interface element to display similar 3D models, according to an embodiment.

FIG. 6 is a flowchart illustrating the generation of user 108 interface element to display similar 3D models, according to an embodiment.

In step 602, client 130 receives one or more similar models to query 3D model 150 from similarity engine 140.

In step 604, client 130 generates a user interface element to enable display of 3D models similar to the query 3D model.

Figure 7A:
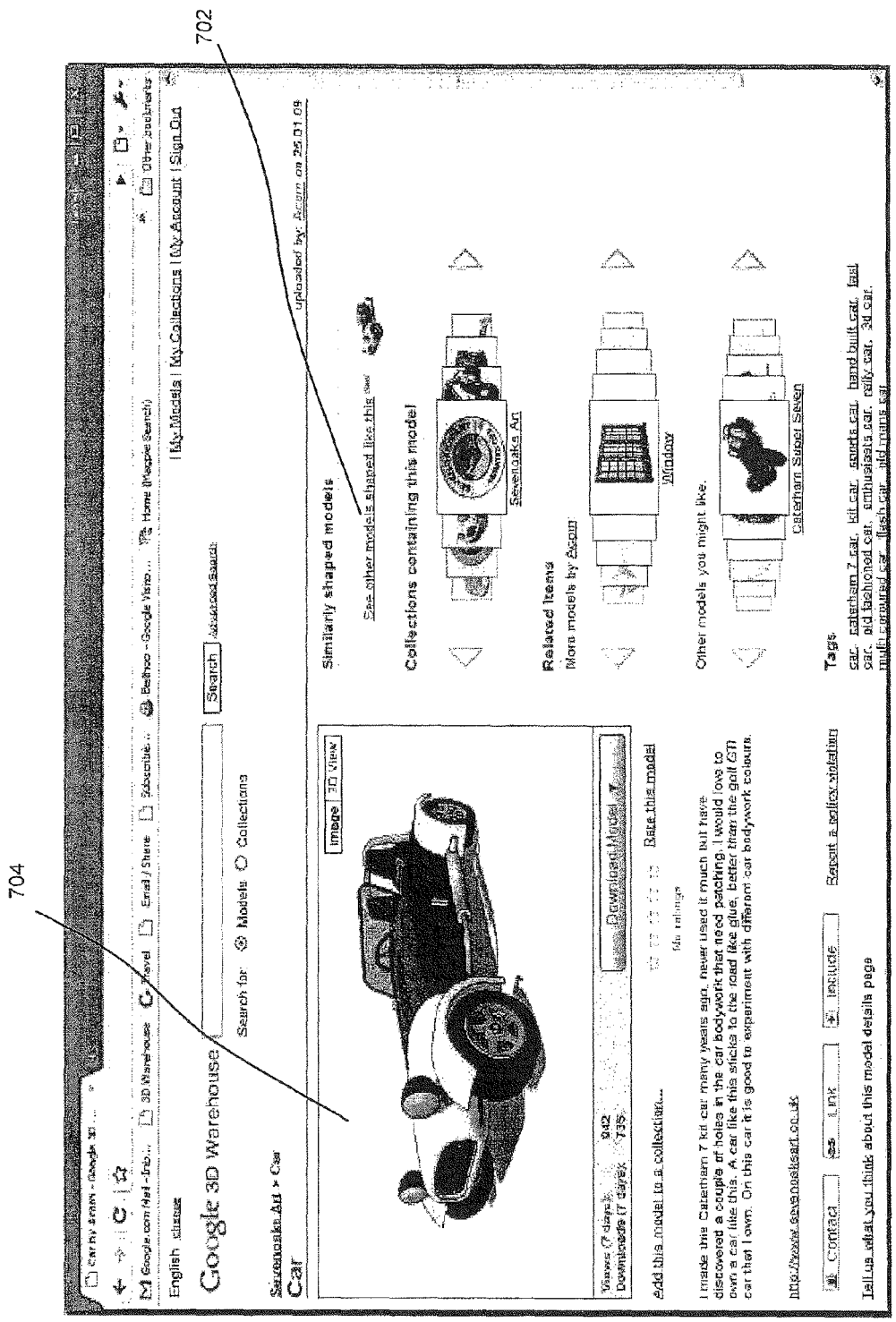
FIG. 7A is an exemplary user interface illustrating a query 3D model and a user interface element to display 3D models similar to the query 3D model, according to an embodiment.

FIG. 7A illustrates an exemplary user interface that enables a user to provide a query 3D model, according to an embodiment of the invention. FIG. 7A illustrates query 3D model 704 provided by user 108. When query 3D model 704 is provided to similarity engine 140, similarity engine 140 determines if there are any 3D models similar to the query 3D model in repository 104. If similar models are found by similarity engine 140, similarity engine 140 displays user interface element 702 to allow a user to view the similar 3D models. As an example, not intended to limit the invention, user interface element 702 is a hyperlink.

Figure 7B:
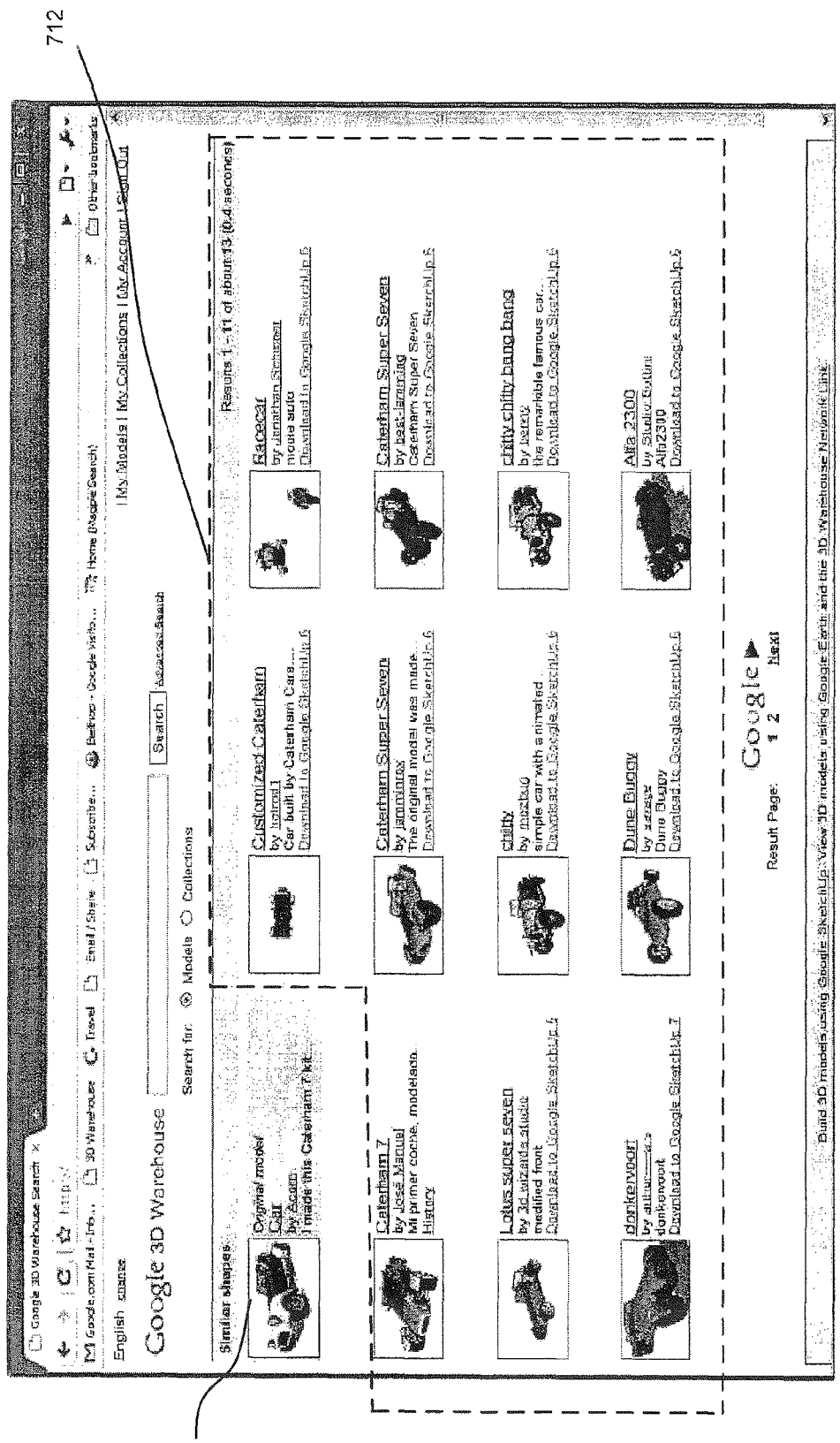
FIG. 7B is an exemplary user interface illustrating a query 3D model and 3D models similar to the query 3D model, according to an embodiment.

When user 108 selects user interface element 702, similarity engine 140 display the similar 3D models 712 along with the query 3D model 704 as shown in FIG. 7B.

4. Example Computer Embodiment

Figure 8:
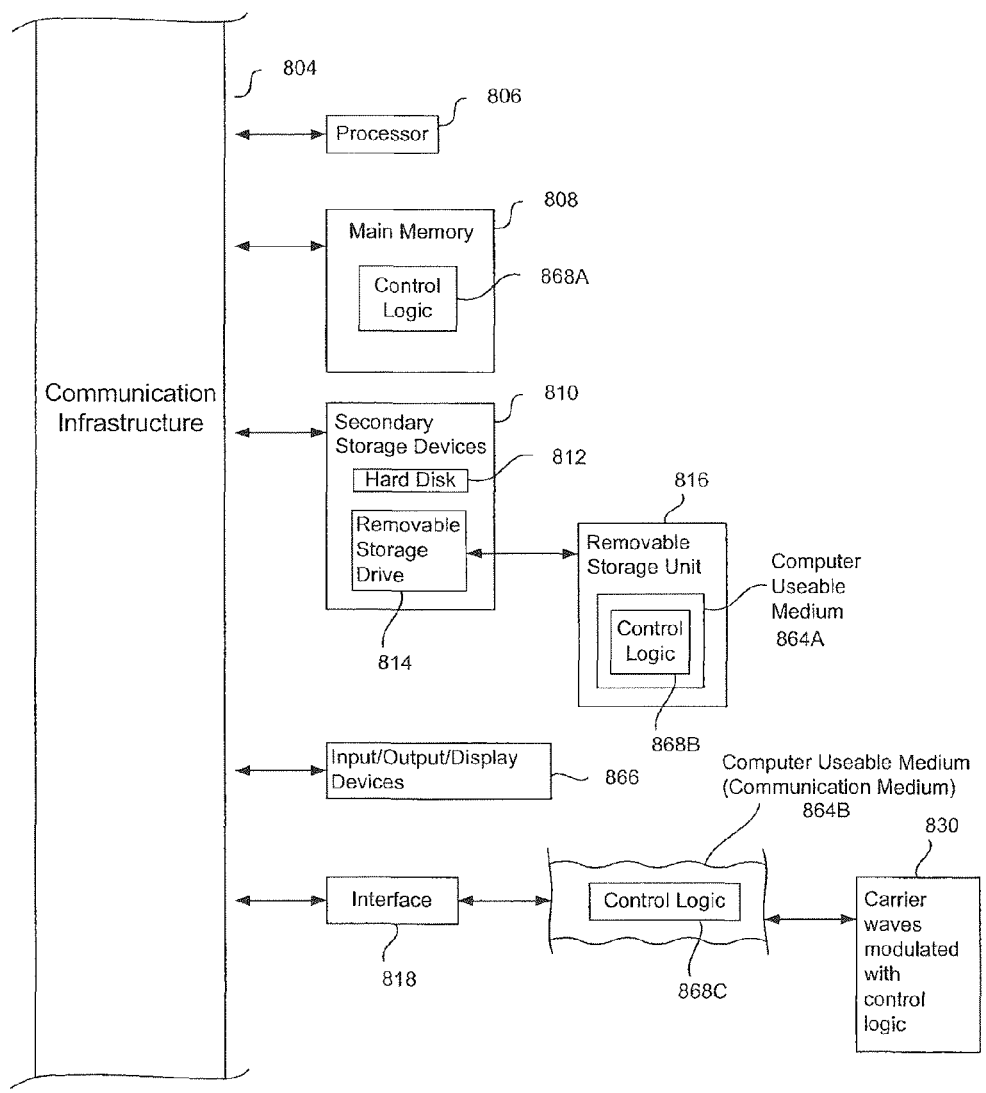
FIG. 8 illustrates an example computer useful for implementing components of embodiments.

In an embodiment of the present invention, the system and components of embodiments described herein are implemented using well known computers, such as example computer 802 shown in FIG. 8. For example, similarity engine 140 and client 130 can be implemented using computer(s) 802.

The computer 802 can be any commercially available and well known computer capable of performing the functions described herein, such as computers available from International Business Machines, Apple, Sun, HP, Dell, Compaq, Digital, Cray, etc.

The computer 802 includes one or more processors (also called central processing units, or CPUs), such as a processor 806. The processor 806 is connected to a communication infrastructure 804.

The computer 802 also includes a main or primary memory 808, such as random access memory (RAM). The primary memory 808 has stored therein control logic 828A (computer software), and data.

The computer 802 also includes one or more secondary storage devices 810. The secondary storage devices 810 include, for example, a hard disk drive 812 and/or a removable storage device or drive 814, as well as other types of storage devices, such as memory cards and memory sticks. The removable storage drive 814 represents a floppy disk drive, a magnetic tape drive, a compact disk drive, an optical storage device, tape backup, etc.

The removable storage drive 814 interacts with a removable storage unit 816. The removable storage unit 816 includes a computer useable or readable storage medium 824 having stored therein computer software 828B (control logic) and/or data. Removable storage unit 816 represents a floppy disk, magnetic tape, compact disk, DVD, optical storage disk, or any other computer data storage device. The removable storage drive 814 reads from and/or writes to the removable storage unit 816 in a well known manner.

The computer 802 also includes input/output/display devices 822, such as monitors, keyboards, pointing devices, etc.

The computer 802 further includes a communication or network interface 818. The network interface 818 enables the computer 802 to communicate with remote devices. For example, the network interface 818 allows the computer 802 to communicate over communication networks or mediums 824B (representing a form of a computer useable or readable medium), such as LANs, WANs, the Internet, etc. The network interface 818 may interface with remote sites or networks via wired or wireless connections.

Control logic 828C may be transmitted to and from the computer 802 via the communication medium 824B. More particularly, the computer 802 may receive and transmit carrier waves (electromagnetic signals) modulated with control logic 830 via the communication medium 824B.

An article of manufacture comprising a computer useable or readable medium having control logic (software) stored therein is referred to herein as a computer program product or program storage device. This includes, but is not limited to, main memory 808, secondary storage devices 810, the removable storage unit 816 and the carrier waves modulated with control logic 830. Such computer program products, having control logic stored therein that, when executed by one or more data processing devices, cause such data processing devices to operate as described herein, represent embodiments of the invention. The term tangible computer program product is used herein to refer to any computer program product but not including a carrier wave or signal alone modulated with control logic.

Embodiments of the invention can work with software, hardware, and/or operating system implementations other than those described herein. Any software, hardware, and operating system implementations suitable for performing the functions described herein can be used. Embodiments of the invention are applicable to a client, a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer implemented method for 3D shape retrieval comprising:
    determining, by one or more processors, a similarity between a query 3D model and one or more 3D models using a composite distance function based on a plurality of features of the query 3D model and corresponding features of the one or more 3D models, wherein a feature distance is computed between the query 3D model and the one or more 3D models for each feature, and the composite distance function is computed as an average of each feature distance or an aggregate of each feature distance according to a pre-determined weighting;
    retrieving, by the one or more processors, one or more similar 3D models based on the determining step;
    ranking, by the one or more processors, the one or more similar 3D models based on the similarity;
    computing a second feature distance between the query 3D model and the one or more 3D models for each feature, from a second set of features, associated with the query 3D model and the one or more 3D models;
    evaluating a second composite distance function using each second feature distance; and
    re-ranking the one or more query 3D models based on results of the evaluated second composite distance function.

2. The method of claim 1, wherein the determining step comprises:
    extracting the plurality of features based on one or more parameters of the query 3D model and corresponding parameters of the one or more 3D models.

3. The method of claim 1, wherein the pre-determined weighting is computed using logistic regression techniques.

4. The method of claim 1, further comprising:
    comparing results of the composite distance function to determine 3D models similar to the query 3D model.

5. The method of claim 1, further comprising:
    constructing a retrieval structure, using each of the one or more 3D models, for each feature associated with the one or more 3D models; and
    searching the retrieval structure, for each feature, to determine 3D models similar to the query 3D model.

6. The method of claim 1, further comprising:
    indicating presence of the one or more similar 3D models based on the retrieving step.

7. The method of claim 1, wherein the indicating step comprises generating a user interface element to display the one or more retrieved 3D models.

8. The method of claim 1, further comprising storing the retrieved 3D models in a 3D model repository.

9. The method of claim 1, wherein the composite distance function is computed using a plurality of feature types, wherein a feature type is either shape-based, appearance-based or location-based.

10. A computer based system for 3D shape retrieval comprising:
    one or more processors; and
    a similarity engine, implemented on the one or more processors, configured to:
        determine a similarity between a query 3D model and one or more 3D models using a composite distance function based on a plurality of features of the query 3D model and corresponding features of the one or more 3D models and to retrieve one or more similar 3D models based on the similarity, wherein a feature distance is computed between the query 3D model and the one or more 3D models for each feature, and the composite distance function is computed as an average of each feature distance or an aggregate of each feature distance according to a pre-determined weighting;
    compute a second feature distance between the query 3D model and the one or more 3D models for each feature, from a second set of features, associated with the query 3D model and the one or more 3D models;

evaluate a second composite distance function using each second feature distance; and re-rank the one or more query 3D models based on results of the evaluated second composite distance function.

11. The system of claim 10, wherein the similarity engine further comprises a ranking engine to rank the one or more similar 3D models based on the similarity.

12. The system of claim 10, wherein the similarity engine further comprises a feature extractor to extract the plurality of features based on one or more parameters of the query 3D model and corresponding parameters of the one or more 3D models.

13. The system of claim 12, further comprising a 3D model repository to store the one or more 3D models.

14. The system of claim 10, wherein the similarity engine further comprises a retrieval structure generator to construct a retrieval structure using each of the one or more 3D models for each feature associated with the one or more 3D models.

15. The system of claim 14, further comprising a searching engine to search the retrieval structure, for each feature, to determine 3D models similar to the query 3D model.

16. The system of claim 10, further comprising a browser to indicate presence of one or more similar 3D models.

17. The system of claim 10, wherein the composite distance function is computed using a plurality of feature types, wherein a feature type is either shape-based, appearance-based or location-based.

* * * * *